F. G. WARBURTON.

CONTROLLING MEANS FOR ELECTRIC MOTORS.

APPLICATION FILED JAN. 18, 1922.

Reissued Mar. 28, 1922. 15,323.

Inventor
F. G. Warburton
By Atherstone & Taylor
Attys.

UNITED STATES PATENT OFFICE.

FRANK GREAVES WARBURTON, OF MANCHESTER, ENGLAND.

CONTROLLING MEANS FOR ELECTRIC MOTORS.

15,323. Specification of Reissued Letters Patent. Reissued Mar. 28, 1922.

Original No. 1,337,573, dated April 20, 1920, Serial No. 133,685, filed November 27, 1916. Application for reissue filed January 18, 1922. Serial No. 530,812.

*To all whom it may concern:*

Be it known that I, FRANK GREAVES WARBURTON, a subject of the King of Great Britain, and resident of the city of Manchester, in England, have invented certain new and useful Improvements in Controlling Means for Electric Motors, of which the following is a full, clear, and exact description.

This invention relates to improvements in means of controlling electric motors and the like, and has the same objects, and is, generally speaking, adapted for the same purposes as the apparatus described in my application, Serial No. 7550, filed February 11th, 1915, of which application the present is a continuation in part.

The particular features in which the present invention differs from that shown in my former application is that this invention is adapted for use in cases where the differential gear set forth in my other application can be dispensed with. The present application contemplates as the elements of the regulator two shafts operated normally at uniform speed. As long as the uniform speed is maintained the two shafts will be relatively stationary. Directly any relative angular movement takes place between these two shafts, a regulator is adjusted to counteract such angular movement.

In the drawings which illustrate the invention:—

Fig. 1 is the diagrammatic view of the invention as applied to a paper machine or the like.

Figure 1:
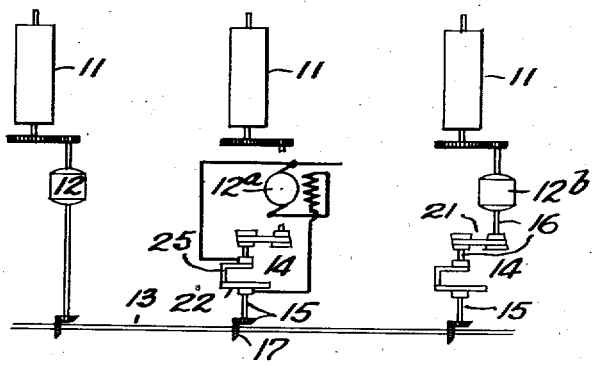
Figure 2:
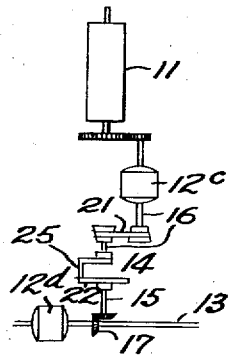
Fig. 2 is a diagrammatic view illustrating a slight variation from Figure 1.

Referring more particularly to the drawings, 11 designates the rolls or units of a paper machine or the like, or any driven device, 12, $12^a$, $12^b$ and $12^c$ designate the motor or motive power connected to each unit, one of which motors is so shown as to indicate the wiring arrangements of this device applied to a D. C. motor. One of the motors of the machine or a separate motor may be used to drive a master shaft 13, normally by gear. Figure 1 shows the master shaft driven by one of the motor units. Figure 2 shows a slight variation, the master shaft being driven by a separate motor $12^e$. A regulator, designated as a whole by the numeral 14, is provided for each motor to be controlled in relation to the speed of the master shaft and is mounted partly on the spur 15, from the master shaft and partly on a separate shaft 16 driven from the motor by cone pulleys. As shown in Figure 1, the spur 15 from the master shaft is driven by bevelled gear 17. In line with it is a separate shaft 16 from the motor, the regulator being mounted on the abutting ends of these two auxiliary shafts. It will, therefore, be seen that if these two abutting shafts, having units of the regulator mounted thereon, revolve at the same speed in the same direction, there will be no angular movement between the portions of the regulator, and therefore, in relation to each other, these units of the regulator will be stationary.

Figure 3:
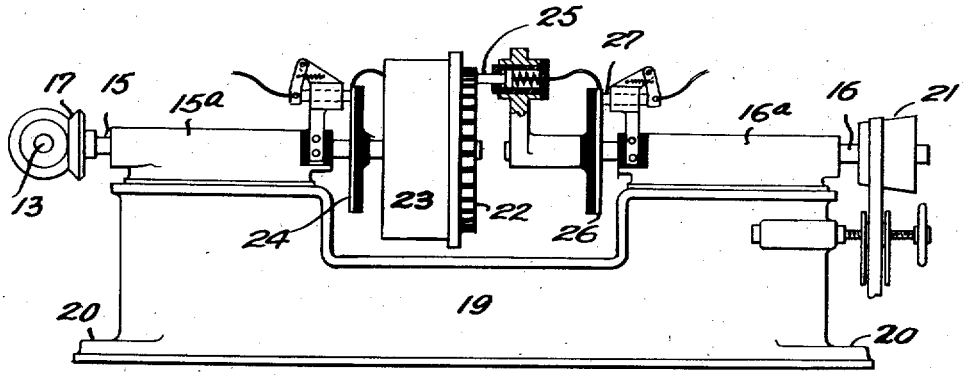
Fig. 3 is a side elevation of one of the regulating units partly in section.
Figure 4:
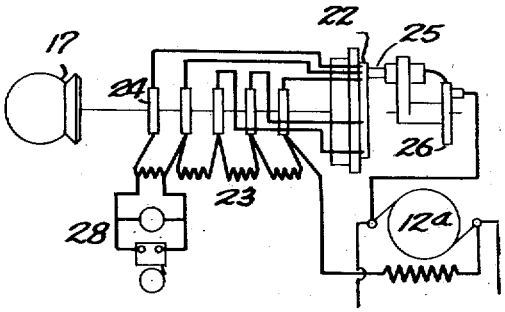
Fig. 4 shows diagrammatically a slight alteration from Figure 3 in that the resistance units are made stationary by use of slip rings.
Figure 5:
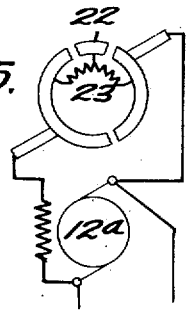
Fig. 5 is a diagram of a regulator commutator and connection.

A single regulator is shown in detail in Figure 3 and is provided with suitable framework 19 having feet 20 by which the gear is bolted down in a suitable position. Shafts 15 and 16 are mounted on framework supported by bearings $15^a$ and $16^a$ respectively. The shaft 15 is driven from the master shaft 13 by means of bevelled gear 17, while the shaft 16 is driven by cone pulley mechanism 21 from the motor $12^a$, etc. These two shafts are arranged axially in line and their adjacent ends preferably have a slight clearance. On one of these two shafts, for instance, 15, is mounted a commutator 22, having any number of segments insulated normally from each other. Figure 5 shows the commutator arranged with three segments, one short and two long. Between these segments resistance 23 is connected, and the resistance either rotates with the commutator as shown in Figure 3, and in the original application, or is stationary as shown in Figure 4, the resistance then being connected to slip rings 24 and the brushes on the slip rings being connected to the motor. The same electrical effect is obtained in either case. On the shaft 16 is mounted a brush 25, which engages with the commutator, and in turn is electrically connected to a slip ring 26 mounted on the same shaft, the brush 27 on slip ring completing electrical connection to the field of the motor.

The use of cone pulleys 21 in the device is normally to give a relative adjustment in speed between the different units 11 of the machine, and when once set on a particular class of duty the belts on these cones would normally be left in that position throughout the entire period of running on that class of goods. If relative speed difference between the various units was not required, the shaft 16 would be either geared or coupled direct to the motors without the intervention of belts.

When in operation, shafts 15 and 16 are revolving quickly and the eye cannot see whether there is relative angular movement between the two shafts and therefore there should be connected between certain contacts of the resistance, as illustrated in Figure 4, an audible or visible signal 28 in the form of a bell or a lamp, so that when current is flowing through this resistance the signal would record. The object of this is to show whether the duty called for is within the capacity of the automatic regulator, if not, assistance would be given to the automatic regulator by adjusting the external field resistance in the motor circuit in series with the regulator resistance.

The operation of the apparatus is extremely simple, and may be readily understood from the following description of operation.

For the purpose of explanation, suppose the gear is applied to a paper making machine driven by D. C. motors, and that the machine is being started up.

The whole of the paper machine would then be brought up to the average required speed by methods common to motor installations, either by altering the voltage of supply or adjusting the amount of resistance in the fields of the motors. All the belts on the cone pulleys would be adjusted according to the draught required in between the different units as nearly as possible.

Imagine now the conditions of the installation with the regulator not in circuit. Motors 12, $12^b$, $12^c$, $12^d$, etc., may all be running at different speeds; the master shaft spurs may be running at another speed, and under these conditions, there is sure to be relative angular movement in varying degree between the different shafts 15 and 16, and such relationship of speeds will vary as conditions acting on each motor vary.

Now imagine all the regulators 14 to be in circuit, then, when acting within the designed capacity of the regulator, there must be an equal number of revolutions of shafts 15 and 16 over any period of time, for directly there is the slightest angular movement a proportional speed correction is applied to the motor in question and equilibrium re-established by the brush on the regulator controlling that motor making contact with another segment of the regulator.

In practice it will be found that the brush on the regulator will move slightly backward and forward on one or more contacts, then, granted no belt slip on the cone pulleys, and there should be no slip as the pulleys have negligible power to transmit and the belt will be made relatively very heavy for the duty, the whole apparatus will act as though the motors were all geared up to the master shaft and the only relative movement which can take place will be equivalent to the backlash of a train of gears.

The whole of the paper machine could be speeded up or down while running by either changing the voltage of supply to all the motors, including the master motor, or by adjusting the resistance in the field circuit of the master motor, and possibly the other motors as well, depending on the designed capacity of the automatic regulator.

Having thus described my invention, what I claim is:—

1. In a device of the character described, the combination with a series of motors of a series of shafts driven thereby, an adjustable connection between said motors and shafts, a second series of shafts, a common operating means driving said second shafts at the same predetermined speed relation as the shafts of the first series, and an electric regulating device for each motor arranged to be operated by speed variations between the first and second shafts pertaining to said motor, said regulating devices each comprising a resistance, a commutator including a short normal contact connected to an intermediate point of the resistance, and long contacts for high and low resistance arranged on each side of the short contact and connected to the resistance on either side of the short contact, and a brush traversing said contacts.

2. In a device of the character described, the combination with a series of motors, of a series of shafts driven thereby, adjustable connections between said motors and shafts, a second series of shafts, a common driving mean therefor operating the second shafts at the same ratio of speed as the first shafts, an electric regulating device for each motor comprising a resistance, a commutator connected thereto, and a brush, said commutator and brush being mounted one on the first shaft and one on the second shaft.

3. Means for electro-mechanically regulating the speed of one motor by the speed of another motor to maintain predetermined speed relation, comprising a field resistance regulator for the motor to be regulated including a revoluble commutator member and revoluble brush member, a driving connection between one of the motors and one regulator part, and a driving connection between the other motor and the other regulator part, and a speed changing device included in one of said driving connections.

4. In a device of the character described, a pair of motors, a pair of regulator parts respectively driven by the motors, a mechanical speed changing device between one of the motors and the corresponding regulator part, a resistance, contacts on one of said regulator parts connected to various points of the resistance, and a brush carried by the other regulator part engaging said contacts, the brush, contacts and resistance being in circuit with the field of one of said motors.

5. In a device of the character described, the combination with first and second motors, of a resistance in series with the field of the second motor, a rotary commutator driven by one of the motors having the contacts thereof connected to various points of said resistance, and a rotary brush driven by the other motor positioned to travel over the commutator contacts and a speed changing device connected between one of the motors and the element driven by it.

6. In a device of the character described, the combination with a pair of motors of a pair of revoluble regulator parts connected respectively to the motors for revolution, normally at the same speed, a resistance in series with said regulator parts and with the field of one of the motors, a commutator located in one of the regulator parts and a brush traversing the commutator located in the other regulator part whereby variation in the speed of the regulator parts due to variation in speed relation of the motors varies the resistance of the motor field and a speed changing device connected between one of the motors and the regulator part driven by it.

7. Means for electro-mechanically regulating a series of motors to maintain pretermined speed relation, comprising a field regulator for each motor including a revoluble commutator member and a revoluble brush member, a speed control element common to all motors, a driving connection between each of the motors and one of the revoluble parts of the regulator pertaining thereto, a driving connection between the second revoluble part of each regulator and the control element whereby variation of speed relation between any motor and the control element operates the regulator to that motor, and a speed changing device included in one of the driving connections of each regulator.

8. Means for regulating the speed of one motor by the speed of another motor comprising a field resistance regulator for one of the motors including a commutator device connected to one of the motors and a brush connected to the other motor, said commutator and brush being normally revolved at the same angular speed and a speed changing device connected between one of the motors and the regulator element driven by it.

9. In a device of the class described, a pair of revolving shafts, a commutator mounted on one of said shafts, a brush mounted on the other shaft, a resistance, a normal contact in the commutator connected to an intermediate point of the resistance, and longer contacts for high and low resistance located one on each side of the normal contact and connected to the resistance at points between the ends, and an intermediate point thereof, whereby small relative angular movements of the commutator and brush will be effective to vary the resistance in circuit.

10. A device of the class described, comprising a pair of revolving shafts adapted to be driven by separate motors, a drum mounted on one of said shafts, a circuit adapted to include the field of one of the motors and including a resistance within the drum, a commutator on one end of the drum having the contacts thereof connected to various points of the resistance, a slip ring on the opposite end of the drum electrically connected to the resistance and insulated from the drum, a brush supplying current to said ring, a brush carried by the other shaft engaging said commutator, a second slip ring electrically connected with said brush and a stationary brush supplying current to said slip ring in combination with a change speed device arranged as a driving connection for one of the shafts.

In witness whereof, I have hereunto set my hand.

FRANK GREAVES WARBURTON.